US011873187B1

(12) United States Patent
Konecny et al.

(10) Patent No.: US 11,873,187 B1
(45) Date of Patent: Jan. 16, 2024

(54) DECORATIVE STRING LIGHT HANGING TOOL

(71) Applicants: Steve Konecny, Tilbury (CA); Ingrid Elisabeth Brand, Tilbury (CA)

(72) Inventors: Steve Konecny, Tilbury (CA); Ingrid Elisabeth Brand, Tilbury (CA)

(*) Notice: Subject to any disclaimer, the term of this patent is extended or adjusted under 35 U.S.C. 154(b) by 130 days.

(21) Appl. No.: 17/673,946

(22) Filed: Feb. 17, 2022

(51) Int. Cl.

| | |
|---|---|
| ***B65H 75/40*** | (2006.01) |
| ***B65H 75/44*** | (2006.01) |
| ***F21V 21/36*** | (2006.01) |
| *F21W 121/04* | (2006.01) |

(52) U.S. Cl.
CPC ....... *B65H 75/406* (2013.01); *B65H 75/4402* (2013.01); *F21V 21/36* (2013.01); *B65H 2701/34* (2013.01); *F21W 2121/04* (2013.01)

(58) Field of Classification Search
CPC .. B65H 75/40; B65H 75/406; B65H 75/4402; B65H 2701/34; F21V 21/36; F21W 2121/04
See application file for complete search history.

(56) References Cited

U.S. PATENT DOCUMENTS

| | | | | |
|---|---|---|---|---|
| 5,868,334 | A | 2/1999 | Cedillo | |
| 6,241,176 | B1 | 6/2001 | McEntee | |
| 6,347,780 | B1 | 2/2002 | Holbrook | |
| 8,752,877 | B2 | 6/2014 | Spindler | |
| D772,027 | S | 11/2016 | Man | |
| 2004/0065764 | A1* | 4/2004 | Rosaen | B65H 75/406 242/395 |
| 2005/0284702 | A1 | 12/2005 | Deslaurier | |
| 2006/0186253 | A1 | 8/2006 | Smith | |
| 2020/0284409 | A1* | 9/2020 | Lingelbach | B25J 1/04 |

FOREIGN PATENT DOCUMENTS

| | | |
|---|---|---|
| CA | 2509569 | 12/2005 |

* cited by examiner

*Primary Examiner* — Sang K Kim
(74) *Attorney, Agent, or Firm* — Kyle A. Fletcher, Esq.

(57) ABSTRACT

The decorative string light hanging tool comprises an extension structure, a guide structure, a spool, and a light string. The guide structure and the spool mount on the extension structure. The spool stores the light string. The decorative string light hanging tool is an extension apparatus. The decorative string light hanging tool deploys the light string for display. The decorative string light hanging tool retracts the light string back into storage.

12 Claims, 4 Drawing Sheets

DECORATIVE STRING LIGHT HANGING TOOL

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of holders for coiled material that repeatedly pays-out and retracts lengths of the material. (B65H75/406)

SUMMARY OF INVENTION

The decorative string light hanging tool comprises an extension structure, a guide structure, a spool, and a light string. The guide structure and the spool mount on the extension structure. The spool stores the light string. The decorative string light hanging tool is an extension apparatus. The decorative string light hanging tool deploys the light string for display. The decorative string light hanging tool retracts the light string back into storage.

These together with additional objects, features and advantages of the decorative string light hanging tool will be readily apparent to those of ordinary skill in the art upon reading the following detailed description of the presently preferred, but nonetheless illustrative, embodiments when taken in conjunction with the accompanying drawings.

In this respect, before explaining the current embodiments of the decorative string light hanging tool in detail, it is to be understood that the decorative string light hanging tool is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the decorative string light hanging tool.

It is therefore important that the claims be regarded as including such equivalent construction insofar as they do not depart from the spirit and scope of the decorative string light hanging tool. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
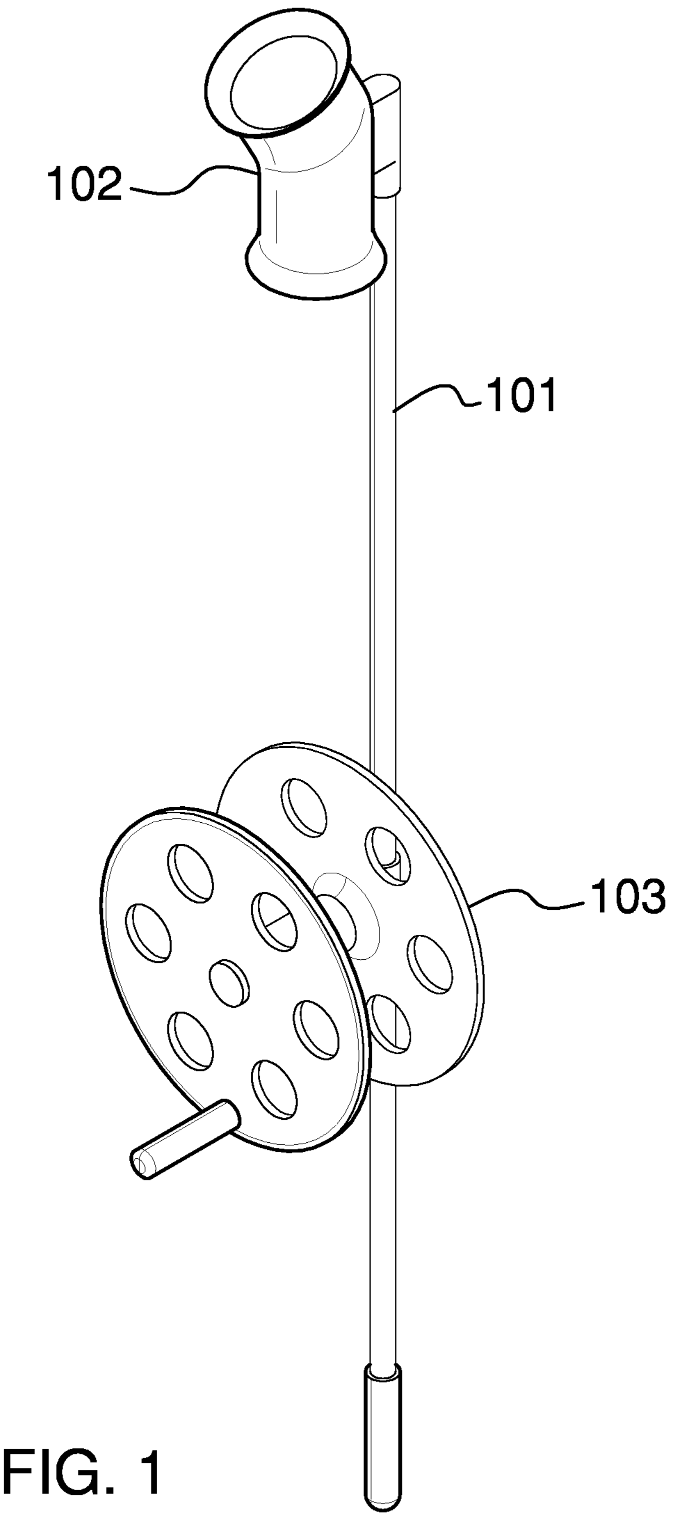
FIG. 1 is a perspective view of an embodiment of the disclosure.
Figure 2:
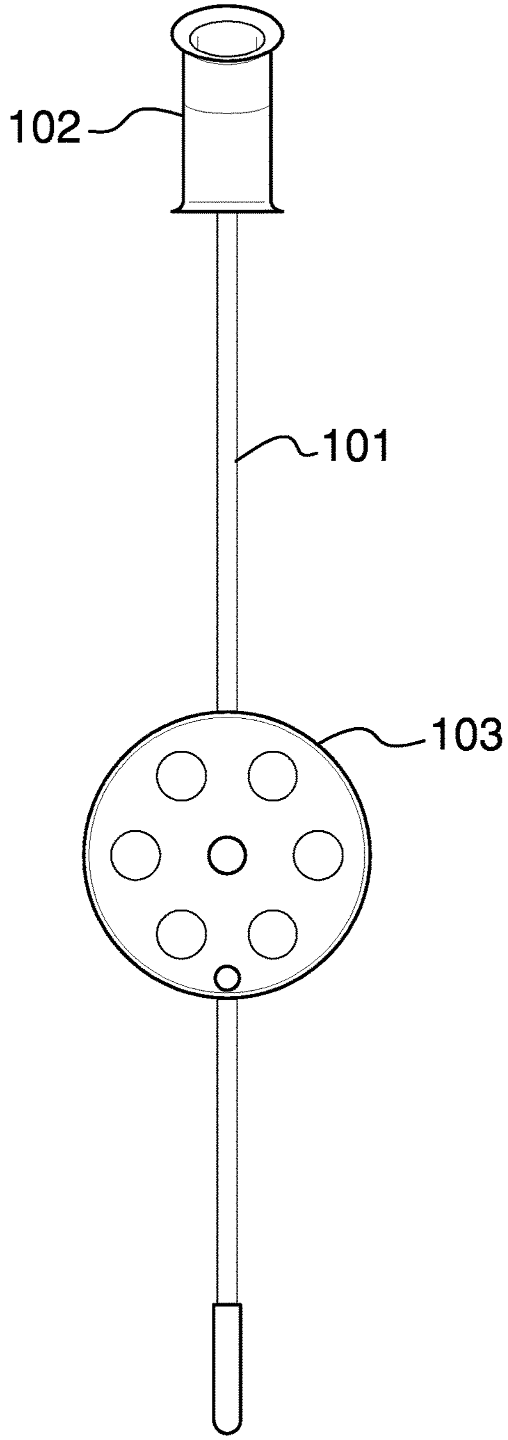
FIG. 2 is a front view of an embodiment of the disclosure.
Figure 3:
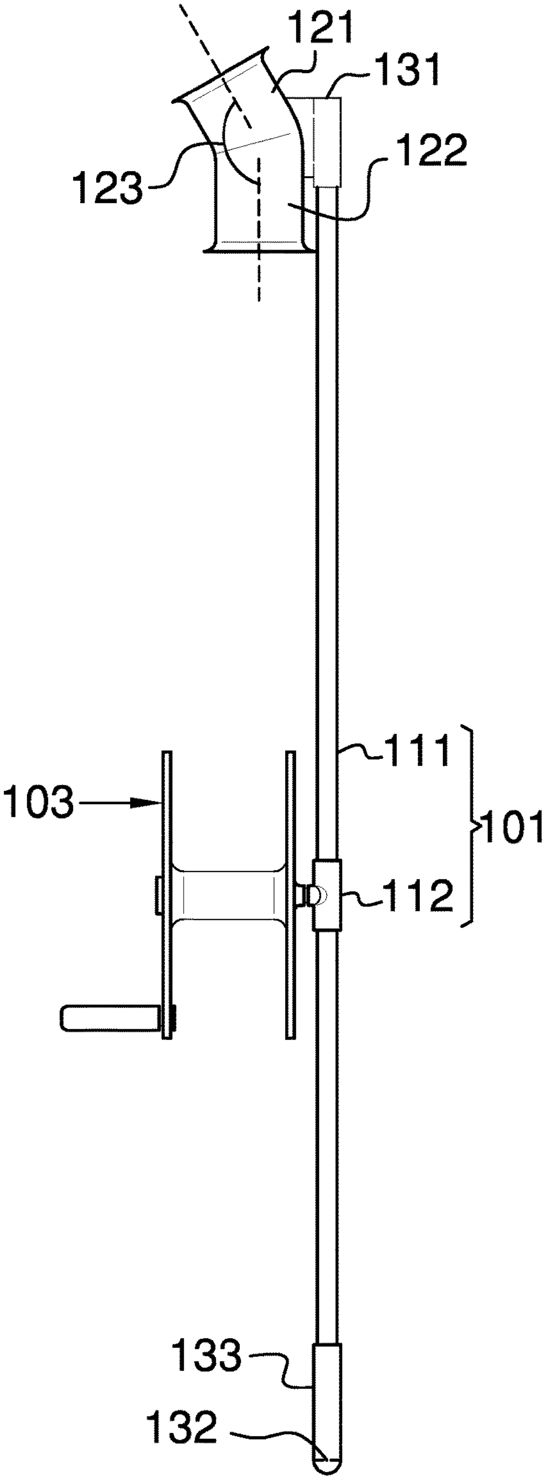
FIG. 3 is a side view of an embodiment of the disclosure.
Figure 4:
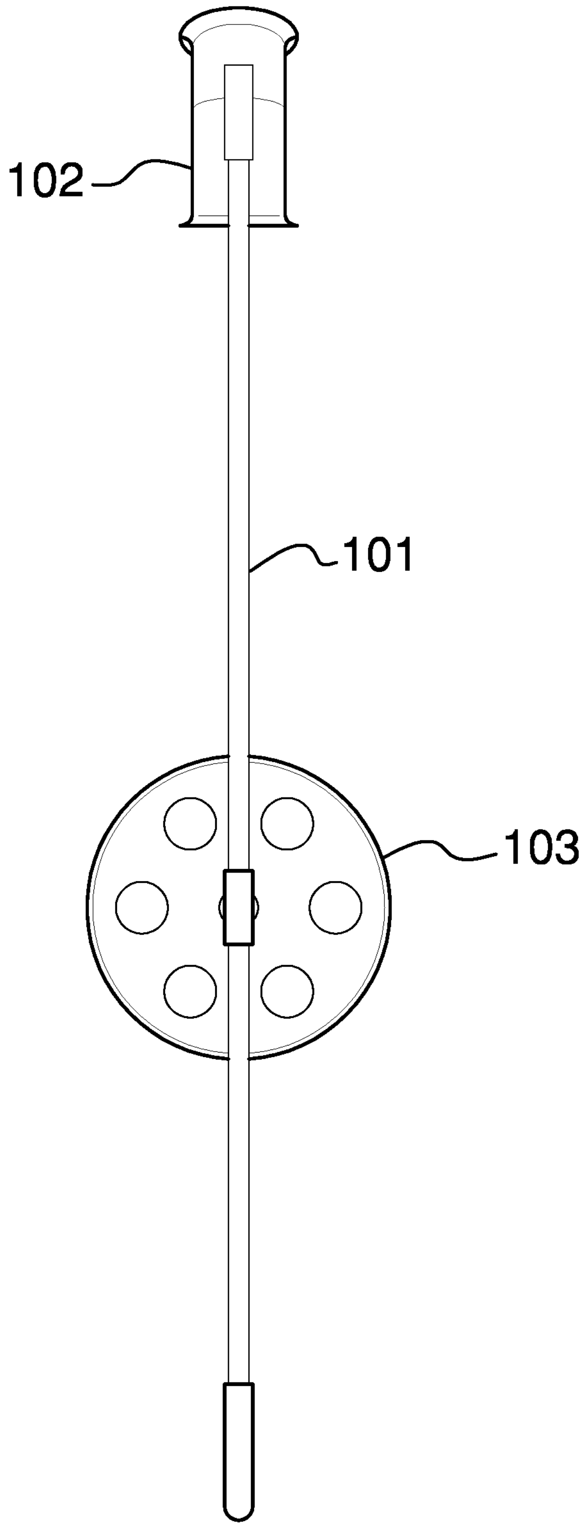
FIG. 4 is a rear view of an embodiment of the disclosure.
Figure 5:
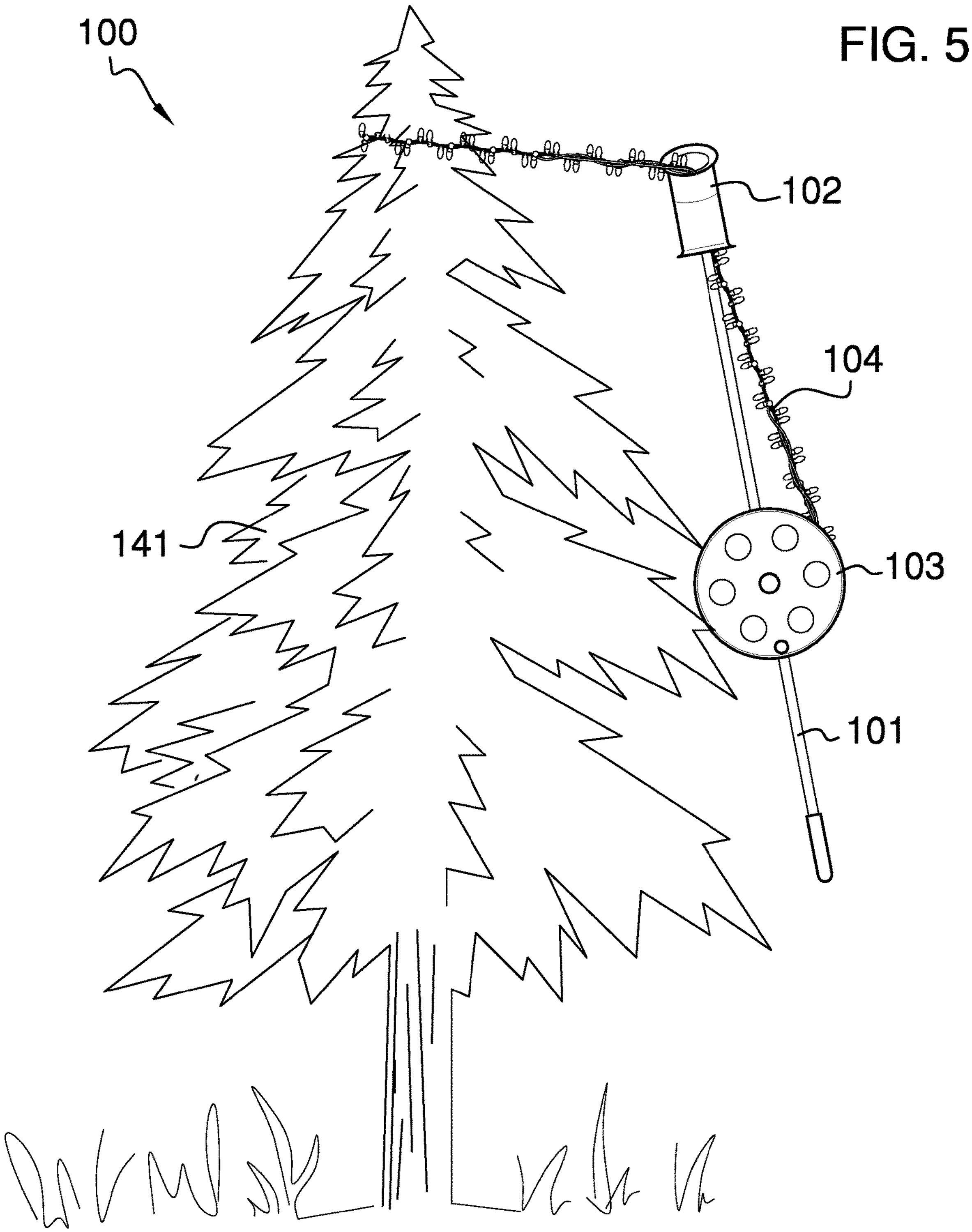
FIG. 5 is an in-use view of an embodiment of the disclosure.

Detailed reference will now be made to one or more potential embodiments of the disclosure, which are illustrated in FIGS. 1 through 5.

The decorative string light hanging tool 100 (hereinafter invention) comprises an extension structure 101, a guide structure 102, a spool 103, and a light string 104. The guide structure 102 and the spool 103 mount on the extension structure 101. The spool 103 stores the light string 104. The invention 100 is an extension apparatus. The invention 100 deploys the light string 104 for display. The invention 100 retracts the light string 104 back into storage.

The light string 104 is a cord like structure. The light string 104 converts electric energy into illumination. The light string 104 is defined elsewhere in this disclosure.

The spool 103 is a cylindrical structure. The spool 103 is a rotating structure. The spool 103 mounts on the extension structure 101 such that the spool 103 rotates relative to the extension structure 101. The light string 104 is stored on the spool 103. The spool 103 rotates in a first direction to deploy the light string 104 from the spool 103. The spool 103 rotates in a second direction to retract the light string 104 onto the spool 103. The second direction is the direction opposite to the first direction. The spool 103 is defined elsewhere in this disclosure.

The extension structure 101 is a prism shaped structure. The extension structure 101 extends the reach between the spool 103 and the targeted object 141. The targeted object 141 is an object that has been selected to receive the light string 104. The extension structure 101 deploys the light string 104 on the targeted object 141. The extension structure 101 comprises a prism structure 111 and a spool 103 mount 112.

The prism structure 111 is a prism shaped structure. The guide structure 102 mounts on the prism structure 111. The spool 103 mounts on the prism structure 111. The prism structure 111 forms the extending structure that extends the reach between the spool 103 and the targeted object 141. The prism structure 111 comprises a first congruent end 131 and a second congruent end 132.

The first congruent end 131 is a congruent end of the prism structure 111. The second tube structure 122 of the guide structure 102 mounts on the prism structure 111 at a location proximal to the first congruent end 131.

The second congruent end 132 is a congruent end of the prism structure 111. The second congruent end 132 is the congruent end of the prism structure 111 that is distal from the first congruent end 131. The spool 103 mount 112 mounts on the prism structure 111 at a location between the second congruent end 132 and the guide structure 102. The second congruent end 132 further comprises a handle 133. The handle 133 is a grip that attaches to the second congruent end 132. The handle 133 provides a non-slip surface that allows for the manipulation of the invention 100.

The spool 103 mount 112 is a prism shaped structure. The spool 103 mount 112 is a hollow structure. The spool 103 mount 112 has a tubular shape. The span of the length of the inner dimension of the spool 103 mount 112 is greater than the span of the length of the outer dimension of the prism structure 111 such that the prism structure 111 inserts through the spool 103 mount 112 to form a composite prism structure. The spool 103 mount 112 is formed with a detent that releasably fixes the spool 103 mount 112 at a fixed position relative to the prism structure 111.

The guide structure 102 is a hollow structure. The guide structure 102 is a tubular structure. The guide structure 102 forms an offset composite prism structure. The guide structure 102 guides the light string 104 away from the spool 103 as the light string 104 is deployed from the invention 100. The guide structure 102 guides the light string 104 onto the spool 103 as the light string 104 is retracted onto the invention 100. The guide structure 102 mounts on the first congruent end 131 of the extension structure 101. The light string 104 is threaded through the tubular structure of the guide structure 102. The guide structure 102 comprises a first tube structure 121, a second tube structure 122, and an offset cant 123.

The first tube structure 121 is a prism shaped structure. The first tube structure 121 is a hollow structure. The first tube structure 121 has a tubular shape.

The second tube structure 122 is a prism shaped structure. The second tube structure 122 is a hollow structure. The second tube structure 122 has a tubular shape. The first tube structure 121 attaches to the second tube structure 122 to form the offset composite prism structure of the guide structure 102. The first tube structure 121 attaches to the second tube structure 122 such that the center axis of the first tube structure 121 forms an offset cant 123 relative to the second tube structure 122.

The light string 104 is threaded from the spool 103 through the second tube structure 122 into the first tube structure 121. The light string 104 is deployed from the first tube structure 121 onto the targeted object 141. The light string 104 is retracted from the targeted object 141 into the first tube structure 121. The second tube structure 122 attaches to the prism structure 111 to form a lateral prism structure. The second tube structure 122 secures the first tube structure 121 to the prism structure 111.

The following definitions were used in this disclosure:

Align: As used in this disclosure, align refers to an arrangement of objects that are: 1) arranged in a straight plane or line; 2) arranged to give a directional sense of a plurality of parallel planes or lines; or, 3) a first line or curve is congruent to and overlaid on a second line or curve.

At a Location Proximal to: As used in this disclosure, the term "at a location proximal to" identifies the position of an object selected from a group relative to an identified location such that the span of distance from the identified location and the selected object is less than the span of distance between the identified location and any object remaining in the group. Stated less formally, at a location proximal to means that the selected object is closer to the identified location than any other object selected from the group.

Cable: As used in this disclosure, a cable is a collection of one or more insulated wires covered by a protective casing that is used for transmitting electricity or telecommunication signals.

Cant: As used in this disclosure, a cant is an angular deviation from one or more reference lines (or planes) such as a vertical line (or plane) or a horizontal line (or plane).

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned. When the center axes of two cylinder, prism or pyramidal structures do not share the same line they are said to be offset.

Composite Prism: As used in this disclosure, a composite prism refers to a structure that is formed from a plurality of structures selected from the group consisting of a prism structure and a pyramid structure. The plurality of selected structures may or may not be truncated. The plurality of prism structures are joined together such that the center axes of each of the plurality of structures are aligned. The congruent ends of any two structures selected from the group consisting of a prism structure and a pyramid structure need not be geometrically similar.

Congruent: As used in this disclosure, congruent is a term that compares a first object to a second object. Specifically, two objects are said to be congruent when: 1) they are geometrically similar; and, 2) the first object can superimpose over the second object such that the first object aligns, within manufacturing tolerances, with the second object.

Cord: As used in this disclosure, a cord is a long, thin, flexible, and prism shaped string, line, rope, or wire. Cords are made from yarns, piles, or strands of material that are braided or twisted together or from a monofilament (such as fishing line). Cords have tensile strength but are too flexible to provide compressive strength and are not suitable for use in pushing objects. String, line, cable, yarn, and rope are synonyms for cord.

Correspond: As used in this disclosure, the term correspond is used as a comparison between two or more objects wherein one or more properties shared by the two or more objects match, agree, or align within acceptable manufacturing tolerances.

Detent: As used in this disclosure, a detent is a device for positioning and holding a first object relative to a second object such that the position of the first object relative to the second object is adjustable.

Disk: As used in this disclosure, a disk is a prism-shaped object that is flat in appearance. The disk is formed from two congruent ends that are attached by a lateral face. The sum of the surface areas of two congruent ends of the prism-shaped object that forms the disk is greater than the surface area of the lateral face of the prism-shaped object that forms the disk. In this disclosure, the congruent ends of the prism-shaped structure that forms the disk are referred to as the faces of the disk.

Elevation: As used in this disclosure, elevation refers to the span of the distance in the superior direction between a specified horizontal surface and a reference horizontal surface. Unless the context of the disclosure suggest otherwise, the specified horizontal surface is the supporting surface the potential embodiment of the disclosure rests on. The infinitive form of elevation is to elevate.

Extension Apparatus: As used in this disclosure, an extension apparatus is a mechanical structure that is used to extend or bridge the reach between any two objects.

Extension Structure: As used in this disclosure, an extension structure is an inert physical structure that is used to extend or bridge the reach between any two objects.

Exterior: As used in this disclosure, the exterior is used as a relational term that implies that an object is not contained within the boundary of a structure or a space.

Force of Gravity: As used in this disclosure, the force of gravity refers to a vector that indicates the direction of the pull of gravity on an object at or near the surface of the earth.

Form Factor: As used in this disclosure, the term form factor refers to the size and shape of an object.

Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides are equal; 3) the angles formed by the first object have a one to one correspondence to the angles of the second object; and, 4) wherein the corresponding angles are equal. The term geometrically identical refers to a situation where the ratio of the length of each pair of corresponding sides equals 1.

Grip: As used in this disclosure, a grip is an accommodation formed on or within an object that allows the object to be grasped or manipulated by a hand.

Handheld: As used in this disclosure, when referring to an item or device, handheld means that the item or device is small and light enough: 1) to be operated while a person holds the item or device in their hands; and, 2) to be carried by hand over a distance.

Handle: As used in this disclosure, a handle is an object by which a tool, object, or door is held or manipulated with the hand.

Horizontal: As used in this disclosure, horizontal is a directional term that refers to a direction that is either: 1) parallel to the horizon; 2) perpendicular to the local force of gravity, or, 3) parallel to a supporting surface. In cases where the appropriate definition or definitions are not obvious, the second option should be used in interpreting the specification. Unless specifically noted in this disclosure, the horizontal direction is always perpendicular to the vertical direction.

Inferior: As used in this disclosure, the term inferior refers to a directional reference that is parallel to and in the same direction as the force of gravity when an object is positioned or used normally.

Interior: As used in this disclosure, the interior is used as a relational term that implies that an object is contained within the boundary of a structure or a space.

Light String: As used in this disclosure, a light string is a commercially available lighting device. The light string illuminates a structure or a space. The light string comprises a cable and a plurality of illuminating elements. The plurality of illuminating elements are distributed along the span of the length of the cable. The cable forms the load path that transfers the load of the plurality of illuminating elements to a supporting structure. The flexible nature of the cable of the light string allows the light string to bend around corners during installation. The light string draws power from an external power source such as the national electric grid. The cable distributes the electric power to the illuminating elements of the light string. Examples of a light string include, but are not limited to, holiday lights and LED ropes.

Load: As used in this disclosure, the term load refers to an object upon which a force is acting or which is otherwise absorbing energy in some fashion. Examples of a load in this sense include, but are not limited to, a mass that is being moved a distance or an electrical circuit element that draws energy. The term load is also commonly used to refer to the forces that are applied to a stationary structure.

Load Path: As used in this disclosure, a load path refers to a chain of one or more structures that transfers a load generated by a raised structure or object to a foundation, supporting surface, or the earth.

Lateral Prism Structure: As used in this disclosure, a lateral prism structure refers to the juxtaposition of a first lateral face of a first prism structure to a second lateral face of a second prism structure such that: a) the center axes of the first prism and the second prism are parallel; and, b) the congruent ends of the first prism are parallel to the congruent ends of the second prism. The span of the length of the center axes of the first prism and the second prism need not be equal. The form factor of the congruent ends of the first prism and the second prism need not be geometrically similar.

Metal: As used in this disclosure, a metal is an element that readily loses electrons or an alloy formed from a plurality of such elements. General properties of metals include, but are not limited to, the ability to conduct heat, conduct electricity, malleability, and the ability to be drawn into a wire. For the purposes of this disclosure, the term metal is assumed to include the transition metals (columns 3-12 of the periodic table) and aluminum, tin, and lead. The alkali metals (columns 1 of the periodic table) and the alkali earth metals (column 2 of the periodic table) are assumed to be excluded from this definition. In this disclosure, the preferred metals for conducting electricity are selected from the group consisting of copper, aluminum, silver, and gold. In this disclosure, the preferred metals for structural purposes are selected from the group consisting of aluminum, iron, and iron based mixtures of metals commonly referred to as steel.

Mount: As used in this disclosure, a mount is a mechanical structure that attaches or incorporates a first object to a second object.

Negative Space: As used in this disclosure, negative space is a method of defining an object through the use of open or empty space as the definition of the object itself, or, through the use of open or empty space to describe the boundaries of an object.

Offset Composite Prism: As used in this disclosure, an offset composite prism structure is a non-Euclidean structure. The shape of the offset composite prism structure is reasonably approximated by a plurality of prism structures. The shape of the offset composite prism structure is formed by joining the congruent end of a first prism structure is joined to the congruent end of a second structure such that the center axis of the first prism structure forms a cant with the center axis of the second prism structure.

One to One: When used in this disclosure, a one to one relationship means that a first element selected from a first set is in some manner connected to only one element of a second set. A one to one correspondence means that the one to one relationship exists both from the first set to the second set and from the second set to the first set. A one to one fashion means that the one to one relationship exists in only one direction.

Pan: As used in this disclosure, a pan is a hollow and prism-shaped containment structure. The pan has a single open face. The open face of the pan is often, but not always, the superior face of the pan. The open face is a surface selected from the group consisting of: a) a congruent end of the prism structure that forms the pan; and, b) a lateral face of the prism structure that forms the pan. A semi-enclosed pan refers to a pan wherein the closed end of prism structure of the pan and/or a portion of the closed lateral faces of the pan are open.

Perimeter: As used in this disclosure, a perimeter is one or more curved or straight lines that bounds an enclosed area on a plane or surface. The perimeter of a circle is commonly referred to as a circumference.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Reach: As used in this disclosure, reach refers to a span of distance between any two objects.

Slide: As used in this disclosure, slide is a verb that refers to an object that is transported along a surface while in continuous contact with the surface. An object being transported along a surface with wheels cannot be said to be sliding. A slide over a short distance is referred to as a slip.

Spool: As used in this disclosure, a spool is a cylindrical device upon which a flexible material, including but not limited to a sheeting, yarn, a cord, or a tape, can be wound. Depending on context, a spool may also contain the flexible material stored upon the spool.

Superior: As used in this disclosure, the term superior refers to a directional reference that is parallel to and in the opposite direction of the force of gravity when an object is positioned or used normally.

Supporting Surface: As used in this disclosure, a supporting surface is a horizontal surface upon which an object is placed and to which the load of the object is transferred. This disclosure assumes that an object placed on the supporting surface is in an orientation that is appropriate for the normal or anticipated use of the object.

Thread: As used in this disclosure, to thread is a verb that refers to inserting a flexible prism structure through a track.

Tube: As used in this disclosure, the term tube is used to describe a hollow prism-shaped device with two congruent open ends. While tubes that are suitable for use in this disclosure are often used to transport or conveys fluids or gases, the purpose of the tubes in this disclosure are structural. In this disclosure, the terms inner dimension and outer dimension of a tube are used as they would be used by those skilled in the plumbing arts.

Vertical: As used in this disclosure, vertical refers to a direction that is either: 1) perpendicular to the horizontal direction; 2) parallel to the local force of gravity; or, 3) when referring to an individual object the direction from the designated top of the individual object to the designated bottom of the individual object. In cases where the appropriate definition or definitions are not obvious, the second option should be used in interpreting the specification. Unless specifically noted in this disclosure, the vertical direction is always perpendicular to the horizontal direction.

Wire: As used in this disclosure, a wire is a structure with the general appearance of a cord or strand but that: 1) may not have the tensile or compressive characteristics of a cord; and, 2) is made from an electrically conductive material.

With respect to the above description, it is to be realized that the optimum dimensional relationship for the various components of the invention described above and in FIGS. 1 through 5 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A decorative string light hanging tool comprising an extension structure, a guide structure, a spool, and a light string;

wherein the guide structure and the spool are each mounted on the extension structure;

wherein the spool stores the light string;

wherein the guide structure is a hollow structure;

wherein the guide structure is a tubular structure;

wherein the guide structure forms an offset composite prism structure;

wherein the guide structure guides the light string away from the spool as the light string is deployed from the decorative string light hanging tool;

wherein the guide structure guides the light string onto the spool as the light string is retracted onto the decorative string light hanging tool;

wherein the guide structure mounts on a first congruent end of the extension structure;

wherein the light string is threaded through the tubular structure of the guide structure.

2. The decorative string light hanging tool according to claim 1 wherein the decorative string light hanging tool deploys the light string for display;

wherein the decorative string light hanging tool retracts the light string back into storage.

3. The decorative string light hanging tool according to claim 2 wherein the light string is a cord like structure;

wherein the light string converts electric energy into illumination.

4. The decorative string light hanging tool according to claim 3 wherein the spool is a cylindrical structure;

wherein the spool is a rotating structure;

wherein the spool mounts on the extension structure such that the spool rotates relative to the extension structure;

wherein the spool rotates in a first direction to deploy the light string from the spool;

wherein the spool rotates in a second direction to retract the light string onto the spool;

wherein the second direction is the direction opposite to the first direction.

5. The decorative string light hanging tool according to claim 4 wherein the extension structure is a shaft;

wherein the extension structure extends the reach between the spool and the targeted object;

wherein the targeted object is an object that has been selected to receive the light string;

wherein the extension structure deploys the light string on the targeted object.

6. The decorative string light hanging tool according to claim 5 wherein the extension structure comprises a prism structure and a spool mount;

wherein the guide structure mounts on the prism structure;

wherein the spool mounts on the prism structure;

wherein the prism structure forms the extending structure that extends the reach between the spool and the targeted object.

7. The decorative string light hanging tool according to claim 6 wherein the prism structure comprises the first congruent end and a second congruent end;

wherein the first congruent end is a congruent end of the prism structure;

wherein a second tube structure of the guide structure mounts on the prism structure at a location proximal to the first congruent end;

wherein the second congruent end is a congruent end of the prism structure;

wherein the second congruent end is the congruent end of the prism structure that is distal from the first congruent end;

wherein the spool mount mounts on the prism structure at a location between the second congruent end and the guide structure.

8. The decorative string light hanging tool according to claim 7 wherein the guide structure comprises a first tube structure and a second tube structure;

wherein the first tube structure attaches to the second tube structure to form the offset composite prism structure of the guide structure;

wherein the first tube structure attaches to the second tube structure such that the center axis of the first tube structure forms an offset cant relative to the second tube structure.

9. The decorative string light hanging tool according to claim 8 wherein the spool mount is a hollow structure;

wherein the spool mount has a tubular shape;

wherein the span of the length of the inner dimension of the spool mount is greater than the span of the length of the outer dimension of the prism structure such that the prism structure inserts through the spool mount to form a composite prism structure;

wherein the spool mount is formed with a detent that releasably fixes the spool mount at a fixed position relative to the prism structure.

10. The decorative string light hanging tool according to claim 9 wherein the first tube structure is a prism shaped structure;

wherein the first tube structure is a hollow structure;

wherein the first tube structure has a tubular shape.

11. The decorative string light hanging tool according to claim 10 wherein the second tube structure is a prism shaped structure;

wherein the second tube structure is a hollow structure;

wherein the second tube structure has a tubular shape;

wherein the light string is threaded from the spool through the second tube structure into the first tube structure;

wherein the light string is deployed from the first tube structure onto the targeted object;

wherein the light string is retracted from the targeted object into the first tube structure;

wherein the second tube structure attaches to the prism structure to form a lateral prism structure;

wherein the second tube structure secures the first tube structure to the prism structure.

12. The decorative string light hanging tool according to claim 11 wherein the second congruent end further comprises a handle;

wherein the handle is a grip that attaches to the second congruent end.

* * * * *